US009804666B2

(12) United States Patent
Jiao

(10) Patent No.: US 9,804,666 B2
(45) Date of Patent: Oct. 31, 2017

(54) WARP CLUSTERING

(71) Applicant: Samsung Electronics Co., Ltd., Suwon-si, Gyeonggi-do (KR)

(72) Inventor: Yang Jiao, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 14/721,304

(22) Filed: May 26, 2015

(65) Prior Publication Data

US 2016/0349832 A1 Dec. 1, 2016

(51) Int. Cl.
*G06F 1/26* (2006.01)
*G06F 1/32* (2006.01)
*G06F 1/00* (2006.01)
*G06T 1/60* (2006.01)

(52) U.S. Cl.
CPC ............. *G06F 1/3296* (2013.01); *G06T 1/60* (2013.01); *G06F 1/26* (2013.01)

(58) Field of Classification Search
CPC ..................................... G06F 1/26; G06F 1/32
See application file for complete search history.

(56) References Cited

U.S. PATENT DOCUMENTS

| | | | |
|---|---|---|---|
| 7,287,148 B2 | 10/2007 | Kanapathippillai et al. | |
| 7,466,318 B1 | 12/2008 | Kilgard | |
| 7,747,842 B1 * | 6/2010 | Goudy | G06F 9/5011 710/57 |
| 7,928,990 B2 | 4/2011 | Jiao et al. | |
| 8,421,794 B2 | 4/2013 | Du et al. | |
| 2004/0012600 A1 | 1/2004 | Deering et al. | |
| 2005/0035965 A1 | 2/2005 | Sloan et al. | |
| 2006/0093222 A1 | 5/2006 | Saffer et al. | |
| 2006/0294520 A1 * | 12/2006 | Anderson | G06F 1/3203 718/100 |
| 2007/0050493 A1 | 3/2007 | Sienel et al. | |
| 2007/0091088 A1 | 4/2007 | Jiao et al. | |
| 2007/0113060 A1 | 5/2007 | Lien et al. | |
| 2007/0174514 A1 * | 7/2007 | Lee | G06F 1/3203 710/52 |
| 2008/0001956 A1 | 1/2008 | Markovic et al. | |
| 2008/0270752 A1 * | 10/2008 | Rhine | G06F 9/5066 712/30 |
| 2009/0010336 A1 | 1/2009 | Au et al. | |

(Continued)

OTHER PUBLICATIONS

Kaseridis et al., "Minimalist Open-page: A DRAM Page-mode Scheduling Policy for the Many-core Era", MICRO 44, Dec. 3-7, 2011.

*Primary Examiner* — Phil Nguyen
(74) *Attorney, Agent, or Firm* — Lewis Roca Rothgerber Christie LLP

(57) ABSTRACT

Units of shader work, such as warps or wavefronts, are grouped into clusters. An individual vector register file of a processor is operated as segments, where a segment may be independently operated in an active mode or a reduced power data retention mode. The scheduling of the clusters is selected so that a cluster is allocated a segment of the vector register file. Additional sequencing may be performed for a cluster to reach a synchronization point. Individual segments are placed into the reduced power data retention mode during a latency period when the cluster is waiting for execution of a request, such as a sample request.

18 Claims, 6 Drawing Sheets

(56) References Cited

U.S. PATENT DOCUMENTS

| | | | |
|---|---|---|---|
| 2009/0027407 A1* | 1/2009 | Bourd | G06T 15/005 345/522 |
| 2009/0109219 A1 | 4/2009 | DeCoro et al. | |
| 2009/0172424 A1* | 7/2009 | Cai | G06F 1/3203 713/300 |
| 2009/0217252 A1 | 8/2009 | Aronson et al. | |
| 2010/0007662 A1 | 1/2010 | Cox et al. | |
| 2010/0123717 A1 | 5/2010 | Jiao | |
| 2010/0131785 A1* | 5/2010 | Blackburn | G06F 1/3203 713/320 |
| 2010/0281489 A1* | 11/2010 | Lee | G06F 9/5038 718/106 |
| 2010/0293401 A1* | 11/2010 | de Cesare | G06F 9/526 713/320 |
| 2010/0295852 A1* | 11/2010 | Yang | G06F 1/3203 345/426 |
| 2011/0227920 A1 | 9/2011 | Adams et al. | |
| 2011/0249744 A1 | 10/2011 | Bailey | |
| 2011/0285711 A1 | 11/2011 | Kilgard | |
| 2012/0223947 A1 | 9/2012 | Nystad et al. | |
| 2012/0242672 A1* | 9/2012 | Larson | G06T 1/20 345/522 |
| 2013/0044117 A1 | 2/2013 | Mejdrich et al. | |
| 2013/0047166 A1* | 2/2013 | Penzes | H03K 3/0315 718/105 |
| 2013/0073884 A1* | 3/2013 | Ulmer | G06F 1/3203 713/320 |
| 2013/0265308 A1 | 10/2013 | Goel et al. | |
| 2013/0265309 A1 | 10/2013 | Goel et al. | |
| 2014/0063013 A1 | 3/2014 | Goel et al. | |
| 2014/0063014 A1 | 3/2014 | Goel et al. | |
| 2014/0118366 A1* | 5/2014 | Hakura | G06T 15/005 345/506 |
| 2014/0173619 A1* | 6/2014 | Nakashima | G06F 9/4893 718/104 |
| 2014/0181479 A1 | 6/2014 | Sasanka | |
| 2016/0321182 A1* | 11/2016 | Grubisic | G06F 12/0833 |

* cited by examiner

WARP CLUSTERING

FIELD OF THE INVENTION

The present invention is generally related to scheduling of clusters of units of shader work in a graphics processing system. More particularly, the present invention is related to scheduling clusters of warps or wavefronts to individual segments of a vector register file.

BACKGROUND OF THE INVENTION

Graphics processing systems are sometimes configured as Single Instruction Multiple Thread (SIMT) machines that have multiple threads that execute the same function. In particular a group, in blocks of threads is assigned to the same processor. A block may further be divided into units of thread scheduling (e.g., units of work). A warp is a group of parallel threads that executes a single instruction from the same instruction stream. An individual warp may, for example, have 32 threads. A warp is also a unit of thread scheduling. A warp also has associated shared resources that are allocated to a warp, include an area in register file.

A warp is an organizational technique appropriate to SIMT style computations where a multiplicity of threads executes the same instruction from the same instruction stream. The warp concept allows the management of these threads to be simplified and streamlined. The warp concept manages sharing of resources over a number of threads and may include:
- sharing the instruction being executed,
- sharing the constant scratch register file,
- sharing an area in a register file,
- sharing the scalar register file,
- sharing memory management, texture or memory resource descriptors, and
- sharing instruction scheduling resources.

Conventionally the scheduling of the warps and the associated memory allocation in a register file is generally optimized for performance and/or memory usage. The warps are typically loaded in the register file in a random order between memory boundaries of the physically separate units of Static Random Access Memory (SRAM) in order to optimize performance. However, the random order of the scheduling optimizes performance but requires the SRAM to remain in an active state that consumes significant power.

While warp is a common term for a unit of thread scheduling promoted by the Nvidia Corporation a similar unit of thread scheduling is known as a wavefront or a wave, where the AMD Corporation has promoted the wavefront as a unit of thread scheduling having 64 threads. The problems of scheduling waves are essentially the same as for warps, aside from trivial differences in implementation. In any case the precise number of threads in a warp or a wave is somewhat arbitrary and is subject to possible further revision as the industry evolves.

SUMMARY OF THE INVENTION

In a graphics processing system with a programmable shader, units of thread scheduling correspond to units of shader work, with warps and wavefronts being examples of units of shader work. Clusters of units of shade work are formed. The scheduling of the clusters is selected so that a cluster is allocated a segment of a vector register file. Additional sequencing may be performed for a cluster to reach a synchronization point. Individual register file segments are placed into a reduced power data retention mode during a latency period when the cluster associated with a segment is waiting for execution of a long latency operation request, such as a texture sample or memory load store request.

In one embodiment a method of operating a shader in a graphics processing system includes allocating a segment of a vector register file as a resource for a cluster of shader units of work assigned to a processor and having temporal locality. Additionally, there may also be spatial locality in terms of pixel shader processing, so that the texture cache efficiency is further improved. In response to the cluster being in an inactive state the segment of the vector register file associated with the cluster is placed in a reduced power data retention mode.

In one embodiment a method of operating a shader in a graphics processing system includes scheduling clusters of shader work for a plurality of processors, each cluster including a plurality of shader units of work assigned to a processor and having temporal locality. An allocation is made for each cluster to allocate a respective segment of physical memory of a vector register file as a resource, each segment having an active mode and a reduced power data retention mode independently selectable from other segments. The execution of the cluster is rotated to place segments of inactive clusters into the reduced power data retention mode.

In one embodiment a shader includes a programmable processing element. A vector register file is used as a resource for units of shader work in which each unit of shader work has a group of shader threads to perform Single Instruction Multiple Thread (SIMT) processing and multiple groups of shader threads are formed into a cluster, the vector register file allocated as a plurality of individual segments. A scheduler groups clusters of units of shader work and selects a schedule to assign an individual cluster to a segment of the register file and place the segment into a reduced power data retention mode during a latency period when the cluster is waiting for a result of a texture sample or memory load store operation.

DETAILED DESCRIPTION

Figure 1:
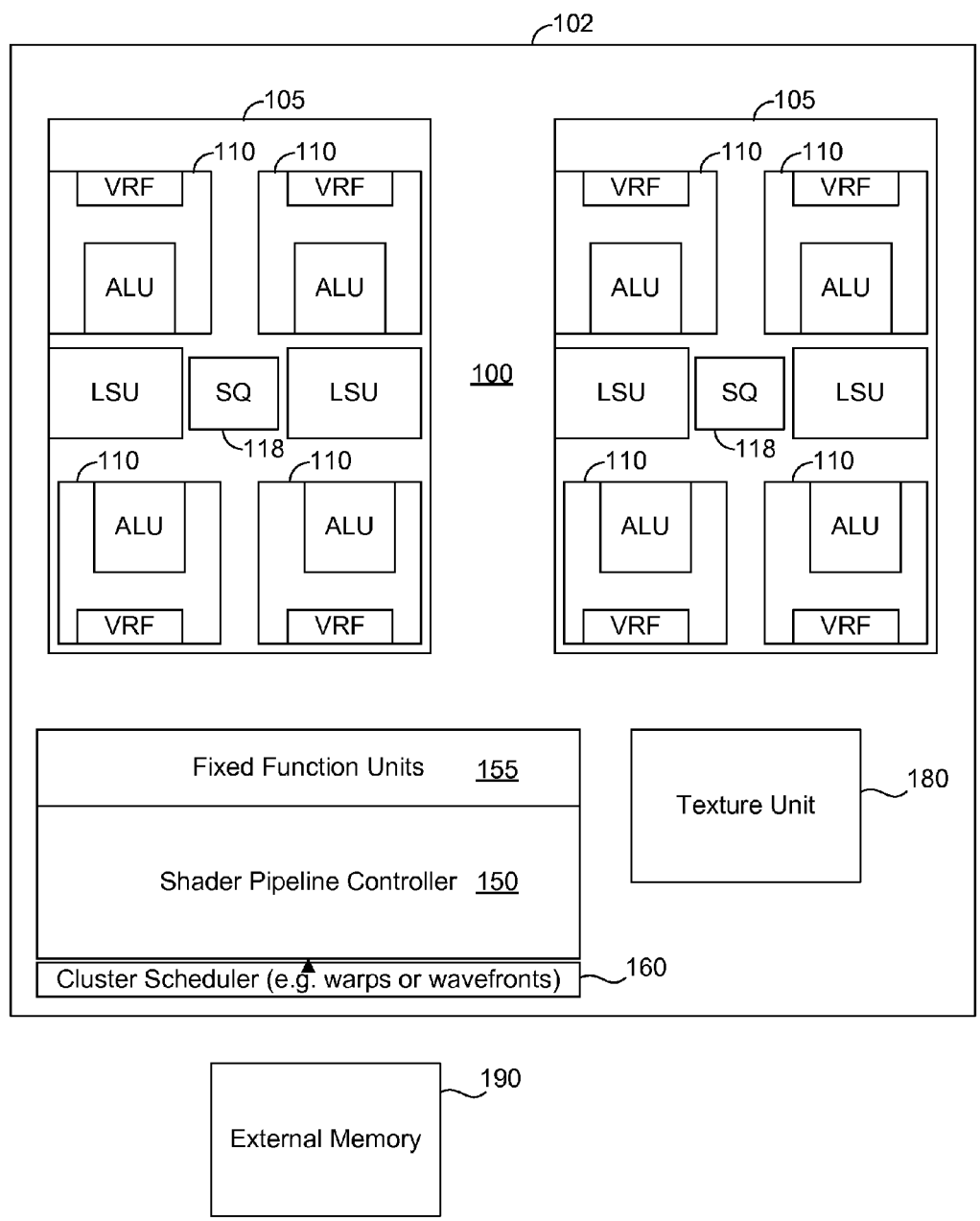
FIG. 1 illustrates a graphics processor in accordance with an embodiment of the present invention.

FIG. 1 illustrates a programmable shader core 100 of a graphics processing unit 102 in accordance with an embodiment of the present invention. The graphics processing unit 102 may be implemented as a system on a chip (SOC). At least one group of processing elements (PEs) 105 is included, where the group of processing elements has a set of processing elements (e.g., PE0, PE1, PE3, PE4.). An individual processing element 110 may, for example include an Arithmetic Logic Unit (ALU) such that there is a set of lanes of identical ALU units. Load Store Units (LSUs) and associated memory controllers support texture accesses to external memory, such as external memory 190. Each processing element 110 includes a vector register file (VRF) implemented in on-chip memory, such as SRAM memory. Buses (not shown) are provided for a processing element to access a texture unit 180, which may, for example, occur during a sample request.

In one embodiment, a shader pipeline controller 150 includes a set of fixed function units 155 to support fixed graphics functions core. Examples of fixed functions include an Input Assembler, Vertex Shader Constructor, Hull Shader Constructor, fixed-function Tessellator, Domain Shader Constructor, Geometry Shader Constructor, Stream Out, Pixel Shader Constructor and Compute Constructor.

In one embodiment a processing slice includes 8 PEs organized into two quads. In one embodiment the PEs support Single Instruction Multiple Thread (SIMT) operation.

In one embodiment each vector register file is allocated into segments, where each segment is capable of being placed into a reduced power data retention mode independently of the other segment(s) of the vector register file. In one embodiment the vector register file is operated as four segments, although different numbers of segments may be used depending on implementation. Each segment, may for example, be physically separate units of SRAM memory.

The programmable shader core 100 includes a scheduler 160 to schedule clusters of work for all of the groups of processing elements. Additionally, each group of processing elements includes a sequencer (SQ) 118.

The programmable shader core 100 includes programmable operations implemented by the processing elements 110 that can have a significant latency, such as accesses to an external memory. For example, a texture fetch requiring access to external memory may have a latency of several hundred cycles.

Figure 2:
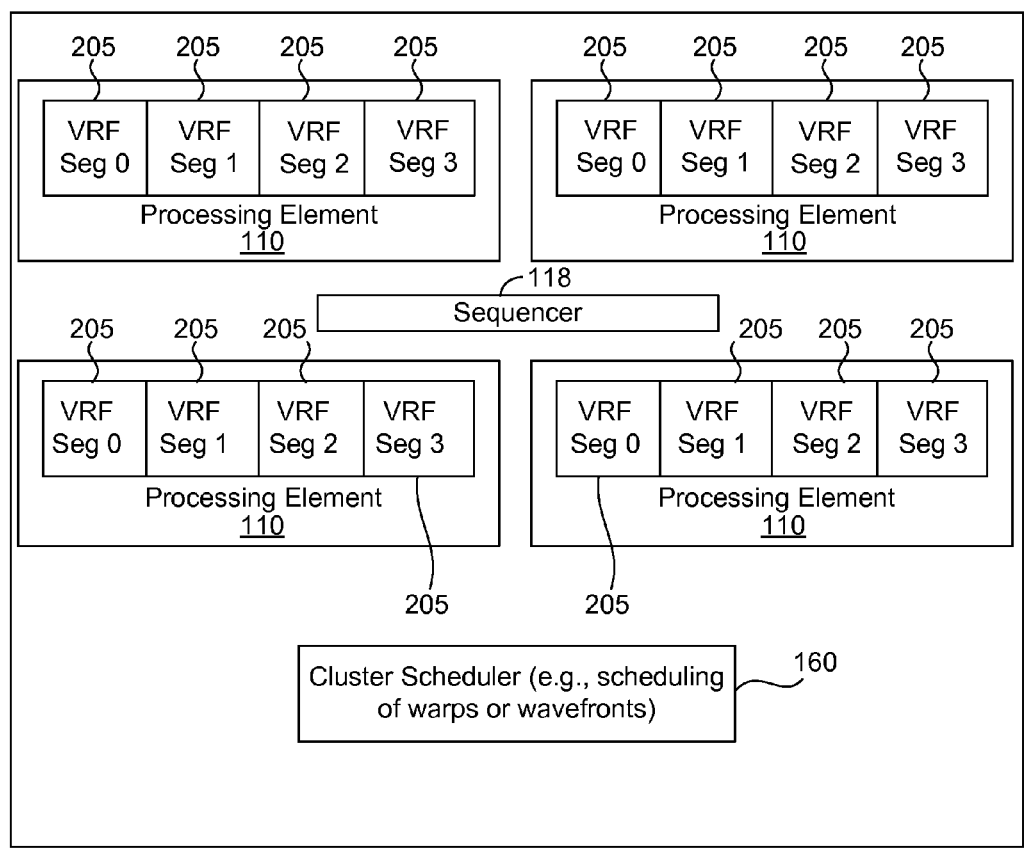
FIG. 2 illustrates aspects of scheduling and sequencing clusters of shader units of work in accordance with an embodiment of the present invention.

FIG. 2 is a simplified diagram of an individual group of processing elements for the purposes of illustrating aspects of clustering and vector register file segmentation. Referring to FIG. 2, in one embodiment the power consumption of each vector register file is reduced by operating the vector register file as a set of segments 205 in which a segment may be independently activated or placed in a reduced power consumption data retention mode. The cluster scheduling unit 160 in the pipeline controller schedules clusters of units of shader work into a segment 205 of the vector register file. An individual shader unit of work corresponds to a group of parallel threads that executes a single instruction from the same instruction stream. An individual unit of work may, for example, be a unit of thread scheduling having a set of parallel threads and associated shared resources allocated to it, including an area in the register file. As illustrative examples, the unit of thread scheduling may include 16, 32, or 64 parallel threads. As another example, an individual unit of work may, for example, be a warp having 32 threads, where a warp is a unit of thread scheduling that has associated shared resources that are allocated to a warp, include an area in register file. Alternatively, the shader unit of work may be a wavefront, where a wavefront has a group of 64 parallel threads to execute single instruction but is otherwise substantially equivalent to a warp. Cluster sizes may be selected for a particular implementation. As one example, a cluster may include two to eight warps. In one embodiment the cluster in the same PE is assigned consecutive shader tasks.

In one embodiment a sequencer 118 is provided to aid in managing the clusters of units of shader work received by a group of processing elements. Among other tasks the sequencer 118 aids in reaching a synchronization point for performing a step having a high latency, such as sending a texture sample or memory load store request for execution. In one embodiment a cluster of work is scheduled and sequenced so that a cluster of work is assigned to a segment of the vector register file associated with a processing element and the segment is configured to go into a low power mode as soon as practical after the cluster of work for that segment has been sent for execution, such a via a texture sample request. It will be understood that the division of work between the sequencer 118 and scheduler 160 may be varied to achieve an equivalent overall functionality of scheduling clusters, managing clusters, and performing optimization to reach a synchronization point.

Figure 3A:
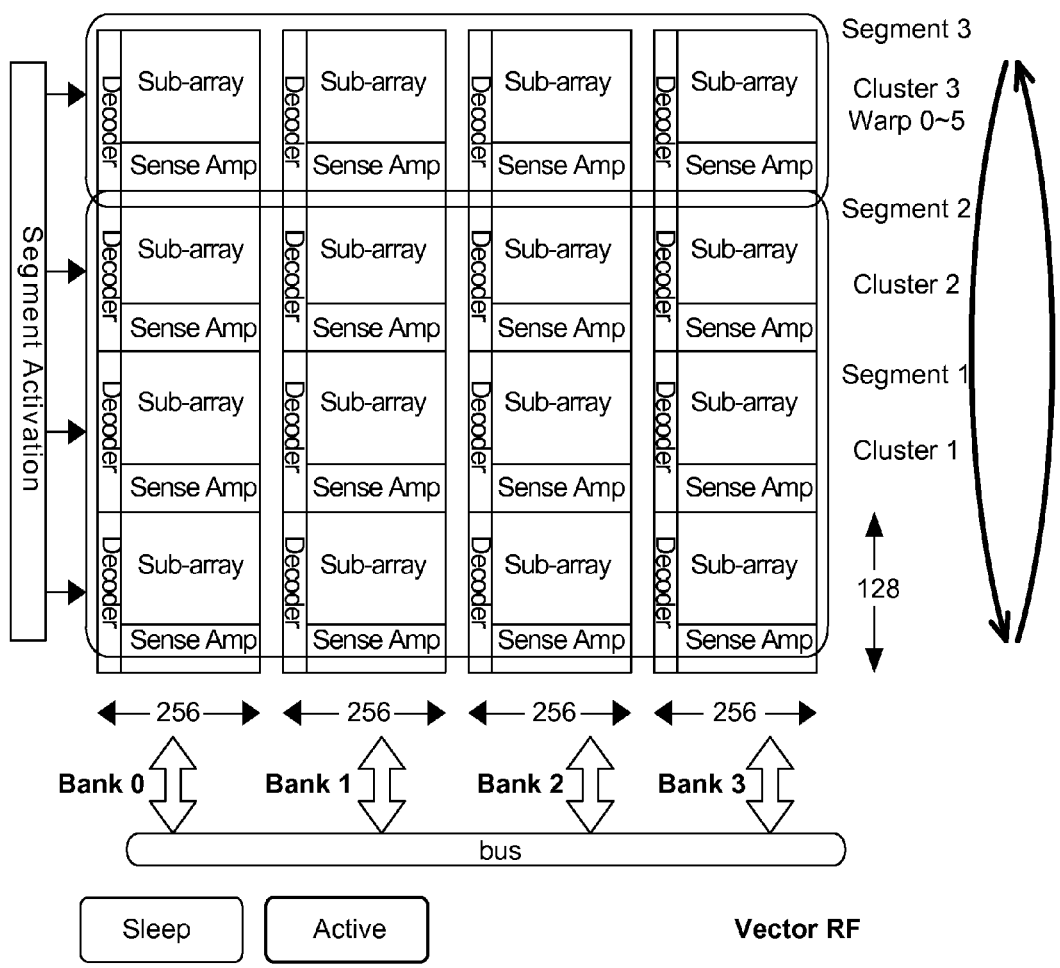
FIG. 3A illustrates an assignment of clusters to segments of a vector register file in accordance with an embodiment of the present invention.

FIG. 3A illustrates an example of vector register file in a PE that is divided into four "segments" in which each segment may be independently activated. In this example the vector register file memory has sub-arrays where each sub-array has a decoder and a sense amplifier. A segment may also have a number of memory banks that may be accessed by a memory bus. In one embodiment the vector register file in each PE is divided into "segments" each located on a separate SRAM bank. In one embodiment a cluster (e.g., a warp cluster) occupies one entire segment in the Vector Register File such that a cluster resides on the same "segment" of the Vector Register File. Different "segments" contain different clusters Thus, in this example segment 1 contains cluster 1, segment 2 contains cluster 2, and so on. In this example, segment 3 and its cluster is active while the other segments and clusters are in a sleep mode. As indicated by the arrows, rotation of execution of the clusters is supported.

Figure 3B:
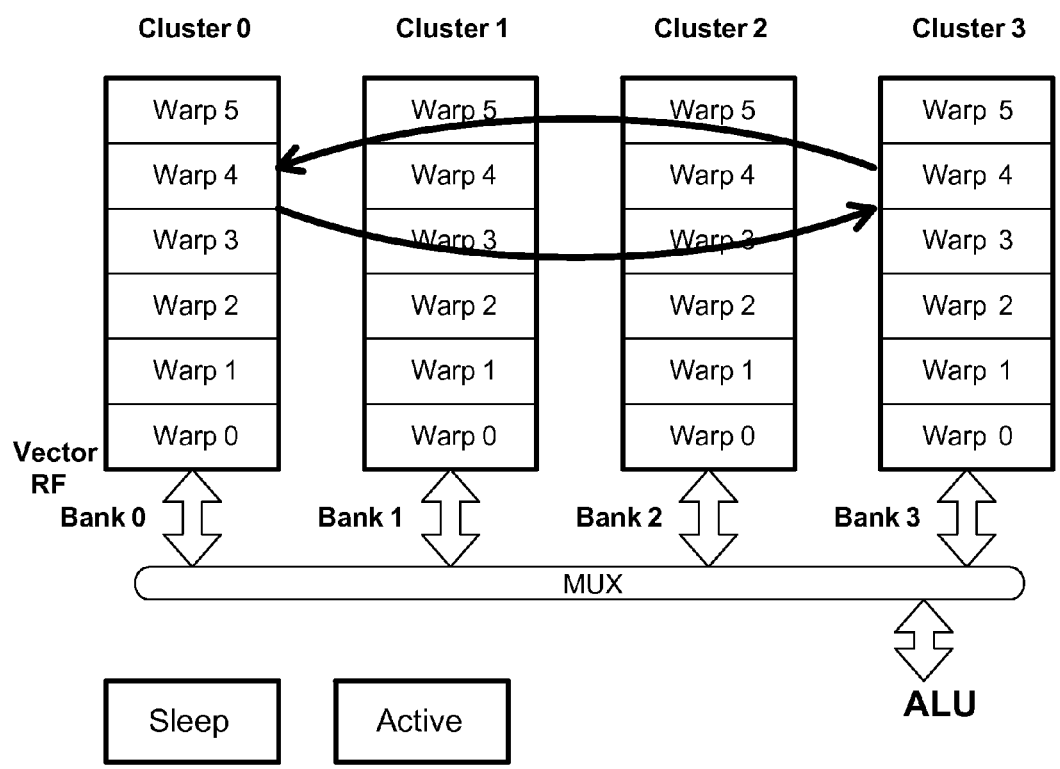
FIG. 3B illustrates rotation of clusters in accordance with an embodiment of the present invention.

FIG. 3B illustrates an example in which the clusters are assigned to different memory banks. Cluster 3 is illustrates as being active and other clusters are asleep. Rotation of cluster execution is illustrated by the arrows. The execution is rotated among the different vector register file segments. At any one given time, most of the clusters are in a sleep mode. This sleep mode may last for an extended period of time corresponding to the external memory access latency for the sample request.

Figure 4:
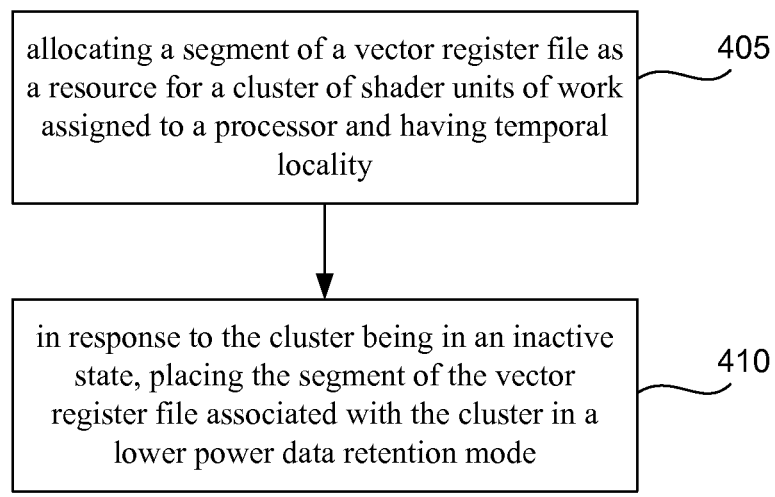
FIG. 4 illustrates a method of allocating a cluster of work to a segment of a vector register file in accordance with an embodiment of the present invention.

FIG. 4 is a flowchart illustrating a method of operating a vector register file as segments in accordance with an embodiment of the present invention. In block 405, a segment of a vector register file is allocated as a resource for a cluster of shader units of work assigned to a processor and having temporal locality. In block 410, the segment of the vector register file associated with the cluster is placed into a lower power data retention mode when the cluster is in an inactive state.

Figure 5:
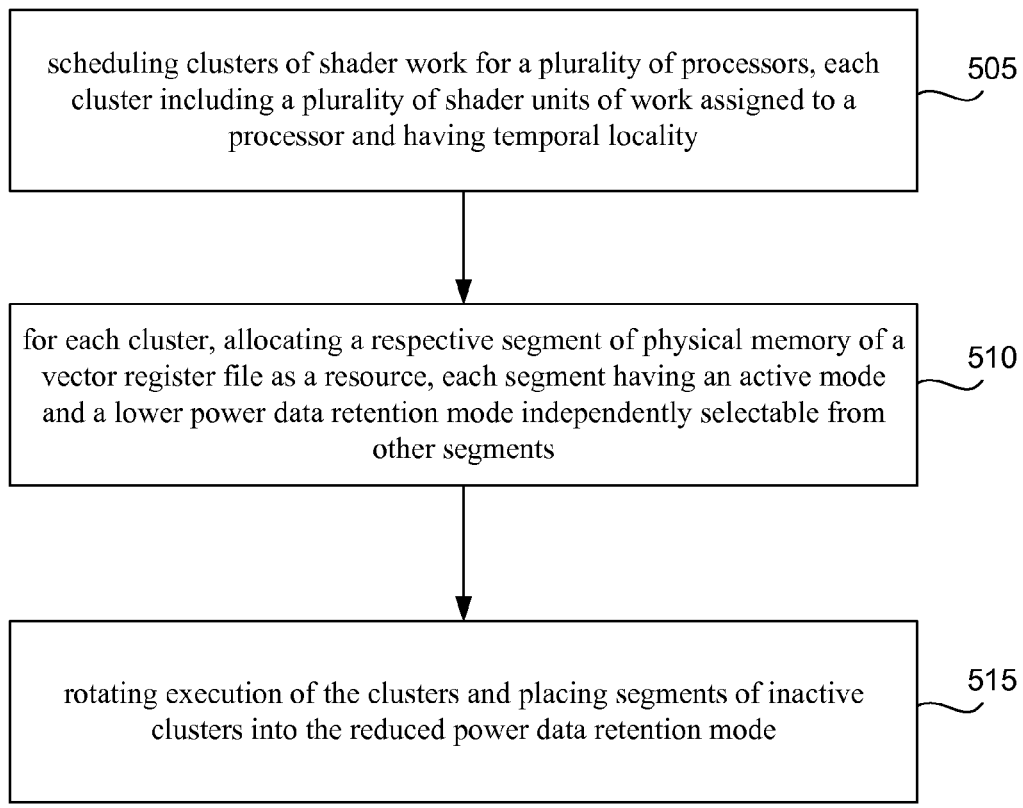
FIG. 5 illustrates a method of rotating execution of clusters to work between different segment of a vector register file in accordance with an embodiment of the present invention.

FIG. 5 is a flowchart illustrating a method of rotating execution of clusters of work in a segmented vector register file. In block 505, scheduling is performed of clusters of shader work in which each cluster is assigned to a processing element. The cluster may be assigned 510 to have a consecutive order of work for temporal locality. Additionally, the assignment of the cluster may also take into consideration the spatial locality in the pixel shader processing to further improve the texture cache efficiency. Each cluster is assigned a segment of a vector register file, where an individual segment has an active mode and a lower power data retention mode. Execution of the clusters may be rotated 510 to place segments of inactive clusters into a reduced power data retention mode.

Additional implementation details will now be described in accordance with an embodiment of the present invention described for a warp implementation. In one embodiment each thread of a warp is allocated a register file where it can perform calculations, perform flow control activities, and reference memory. In one embodiment all threads in a warp share a scalar register file. This is a register file where values are held that are common across every member of the warp. This scalar register file can be used to compute a value once, in one lane, and used across the entire warp as operands to thread instructions.

In one embodiment, the warp that can manage up to 32 threads organized as 8 threads in the spatial dimension and 4 threads in the temporal dimension. In one embodiment the 8 wide nature of the execution is processed by 8 lanes of computations of eight PEs. The 4 threads in the temporal dimension are managed as 4 cycles of execution in the computation unit pipeline.

In one embodiment the shader pipeline controller includes a Cluster Scheduler and each group of processing elements includes a Sequencer (SQ). In one embodiment for the case of warps, the scheduler in the shader pipeline controller is a warp scheduler configured so that at least two warps (e.g., 2 to 8 warps) in the same PE are assigned to consecutive shader tasks from the same shader pipeline stage, for example, four SIMT32 warps in PE0 are assigned to the consecutive Pixel Shader tasks for 128 pixels are part of a bundled group of warps called warp cluster. Assigning warps of the same PE to consecutive shader tasks of the same shader stage results in high temporal coherence.

In one embodiment the scheduler interfaces with shader pipeline controller to allocate units of shader work, attach register files, and initialize thread registers and scalar registers for the unit of shader work being initialized. When a shader unit of work completes, the resources of that unit of work are deallocated and made available to future allocations.

In one embodiment each group of PEs includes a cluster sequencer operating as a central control block in a PE quad that handles the sequencing and management of clusters of shader units of work. In one embodiment the sequencer contains an instruction buffer, a constant scratch register file, and the pre-decoding stage of the instruction pipeline. The cluster sequencer interfaces with the cluster scheduler in the shader pipeline controller unit to allocate shader units of work, register file and other shader related resources to the unit of work, and enable the shader constructors to deliver values to shader units of work.

In one embodiment the sequencer manages each warp in a quad through execution. When all initialization has been performed, the warp is a candidate for execution. The cluster scheduler selects between candidates and chooses which warp will enter execution next. When the currently running warp completes the last instruction of a trace, the scheduled warp enters execution of its trace, while the sequencer monitors the completion status of outstanding requests. Once all outstanding requests are satisfied this warp can again become a candidate and be selected to execute its subsequent next trace.

In one embodiment a trace is used to aid in management of warps. A trace is a sequence of instructions that once started will proceed to completion. A trace is denoted by a trace header instruction which includes the resource requirements of all instructions up to the subsequent trace header. The resource requirement list contains the number and kind of resource requests needed to satisfy the instructions in the trace. So, for example, it will contain the number of memory reference instructions (if any) so that the appropriate sized memory address buffer can be allocated; it will contain the number of texture coordinate addresses required (if any), and will contain the number of results emitted from this trace. Once a warp of threads starts processing the instructions of a trace, they proceed to the end of the trace without stalling. Each instruction in a trace is executed for each execution mask enabled member of the warp until the end of the trace is encountered. At such time, the warp scheduler will have chosen the subsequent warp and trace, and the processor begins execution of this new trace with the threads of the chosen warp.

In one embodiment the scheduler will keep assigning warps from the same PE to a shader stage and allocating registers from the same segment of vector register file until the "segment" is full. All the warps assigned share the same segment of vector register file and form a cluster. The cluster will execute the same shader program on the same PE.

By grouping multiple warps into a warp cluster the warps are executed with temporal locality and thus they share the same instruction traces in the instruction buffer to save the instruction fetch and possibly the instruction decoding. A warp cluster may execute traces out of order based on the resource availability to maximize the PE data path utilization. In one embodiment these warps only sync when the texture SAMPLE commands are processed in a texture unit, and these texture SAMPLE requests are handled strictly in order. In one embodiment the sequencer sequences the traces to prioritize the warps within the same warp cluster so that they can reach the sync point as soon as possible.

When the last SAMPLE request of a warp cluster is sent to the texture unit, the entire cluster goes into a sleep mode and the vector register file segment switches to lower power data retention mode.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of reducing power consumption in a shader of a graphics processing system, the method comprising:
   organizing a vector register file into a plurality of segments of physical memory, with each segment having an active mode and a reduced power data retention mode independently selectable from other segments of the vector register file;

allocating each of the segments as a resource for a respective one of a plurality of clusters of multiple shader units of work assigned to a processor and having temporal locality and spatial locality;

scheduling execution of the clusters in a sequence; and placing each of the segments that are respectively associated with the clusters that are in an inactive state into the reduced power data retention mode during at least a portion of a latency period for a texture load for the clusters.

2. The method of claim 1, wherein the clusters are placed into the inactive state in response to completion of sending texture sample or memory load store commands of the cluster to an external unit.

3. The method of claim 1, wherein the clusters are placed into the inactive state in response to completion of sending texture sample or memory load store commands of the cluster to a texture unit.

4. The method of claim 1, further comprising using the vector register file as a resource for units of shader work in which each unit of shader work comprises a group of shader threads to perform Single Instruction Multiple Thread (SIMT) processing.

5. The method of claim 1, further comprising prioritizing the shader units of work within each of the clusters to reach a synchronization point for loading a texture sample.

6. The method of claim 1, wherein the clusters are assigned to consecutive shader tasks of a shader stage.

7. The method of claim 1, wherein each shader unit of work is a unit of thread scheduling.

8. A method of reducing power consumption in a shader of a graphics processing system, the method comprising:

scheduling clusters of shader work for a plurality of processors, each cluster including a plurality of shader units of work assigned to a processor and having temporal locality and spatial locality;

for each cluster, allocating a respective segment of physical memory of a vector register file as a resource, each segment having an active mode and a reduced power data retention mode independently selectable from other segments;

scheduling execution of the clusters in a sequence;

rotating execution of the clusters; and placing segments of inactive clusters into the reduced power data retention mode during at least a portion of a latency period for a texture load for the inactive clusters.

9. The method of claim 8, further comprising placing segments of inactive clusters into the reduced power data retention mode during at least a latency for a data access.

10. The method of claim 1, further comprising placing the segments of each of the clusters awaiting a data load into the reduced power data retention mode.

11. The method of claim 8, further comprising using the vector register file as a resource for units of shader work in which each unit of shader work has a group of shader threads to perform Single Instruction Multiple Thread (SIMT) processing.

12. The method of claim 8, further comprising prioritizing the shader units of work within each cluster to reach a synchronization point for loading a texture sample.

13. The method of claim 8, further comprising assigning the clusters to consecutive shader tasks of a shader stage.

14. The method of claim 8, wherein each shader unit of work is a unit of thread scheduling.

15. A graphics processing unit, comprising:

a plurality of programmable processors to perform Single Instruction Multiple Thread (SIMT) processing of shading instructions, each programmable processor including a vector register file having a plurality of data segments, each segment having an active mode and a reduced power data retention mode independently selectable from other segments;

a scheduler to schedule clusters of shader work for the plurality of programmable processors, each cluster including a plurality of shader units of work assigned to an individual processor and having temporal locality and spatial locality, with each cluster supported by a segment of the vector register file of the assigned individual processor, the scheduler for selecting a schedule to rotate execution of the clusters to place segments of inactive clusters into the reduced power data retention mode during at least a portion of a latency period associated with an operation request by the cluster; and an external memory comprising a texture unit, wherein segments of inactive clusters are placed in the reduced power data retention mode during at least a portion of a latency period associated with accessing the external memory for a texture access of a cluster.

16. The graphics processing unit of claim 15, further comprising a sequencer to prioritize the shader units of work within each cluster to reach a synchronization point.

17. The graphics processing unit of claim 15, further comprising a load and store unit to access the external memory, wherein segments of inactive clusters are placed into the reduced power data retention mode during at least a portion of a latency period associated with accessing the external memory for a cluster.

18. A graphics processing unit, comprising:

a shader including a programmable processing element;

a vector register file used as a resource for units of shader work in which each unit of shader work has a group of shader threads to perform Single Instruction Multiple Thread (SIMT) processing and multiple groups of shader threads are formed into a cluster, the vector register file allocated as a plurality of individual segments;

a scheduler to group clusters of units of shader work and select a schedule to assign an individual cluster to a segment of the vector register file and place the segment into a reduced power data retention mode during a latency period when the cluster is waiting for a result of a sample request during at least a portion of a latency period associated with an operation request by the cluster; and an external memory comprising a texture unit, wherein segments of inactive clusters are placed in the reduced power data retention mode during at least a portion of a latency period associated with accessing the external memory for a texture access of a cluster.

* * * * *